United States Patent
Han (10) Patent No.: US 10,994,780 B2
(45) Date of Patent: May 4, 2021

(54) APPARATUS AND METHOD FOR DETERMINING TARGET ANGLE BASED ON RADAR, AND RADAR APPARATUS WITH THE SAME

(71) Applicant: MANDO CORPORATION, Gyeonggi-do (KR)

(72) Inventor: Yun Ki Han, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 198 days.

(21) Appl. No.: 16/292,203

(22) Filed: Mar. 4, 2019

(65) Prior Publication Data
US 2019/0270483 A1    Sep. 5, 2019

(30) Foreign Application Priority Data
Mar. 5, 2018    (KR) .................... 10-2018-0025682

(51) Int. Cl.
B62D 15/02    (2006.01)
G01S 13/42    (2006.01)
G01S 13/931    (2020.01)

(52) U.S. Cl.
CPC ............ *B62D 15/024* (2013.01); *G01S 13/42* (2013.01); *G01S 13/931* (2013.01); *G01S 2013/932* (2020.01)

(58) Field of Classification Search
CPC ..... B62D 15/024; G01S 13/42; G01S 13/931; G01S 2013/932; G01S 13/62
(Continued)

(56) References Cited

U.S. PATENT DOCUMENTS

| 8,031,062 B2* | 10/2011 | Smith .................. G08G 1/0962 340/438 |
| 9,110,169 B2* | 8/2015 | Stettner ................... B60R 21/36 |
| 9,274,222 B1* | 3/2016 | Schmalenberg ........ G01S 13/42 |
| 2009/0121916 A1* | 5/2009 | Miyake .................. G01S 13/42 342/70 |

(Continued)

FOREIGN PATENT DOCUMENTS

| DE | 10 2005 007917 | 6/2006 |
| JP | 2006-284181 | 10/2006 |

(Continued)

OTHER PUBLICATIONS

Office Action dated Jun. 8, 2020 for Korean Patent Application No. 10-2018-0025682 and its English machine translation by Google Translate.

(Continued)

*Primary Examiner* — Jonathan M Dager
*Assistant Examiner* — Jean W Charleston
(74) *Attorney, Agent, or Firm* — Ladas & Parry, LLP (57) ABSTRACT

The present disclosure relates to an apparatus and method for determining the angle of the target detected by the radar of the vehicle. The target angle determination apparatus may be configured to calculate a first angle of the first group target included in the radar data by using the first angle calculation algorithm with the low resolution, to determine a part of the first group target and the second group target based on the possible driving route of the host vehicle, and to calculate the second angle of the second angle target selected from the first group target by using the second angle calculation algorithm with the high resolution based on the possible driving route of the host vehicle, so that it is possible to minimize unnecessary calculation operations and reduce the system load.

20 Claims, 6 Drawing Sheets

(58) Field of Classification Search
USPC .......................................................... 701/41
See application file for complete search history.

(56) References Cited

U.S. PATENT DOCUMENTS

| | | | |
|---|---|---|---|
| 2011/0193740 A1 | 8/2011 | Kanamoto | |
| 2015/0100189 A1* | 4/2015 | Tellis | G08G 1/096791 701/23 |
| 2015/0225017 A1* | 8/2015 | Takeda | B62D 15/025 701/41 |
| 2015/0232104 A1* | 8/2015 | Sudou | B60W 30/16 701/1 |
| 2015/0309168 A1* | 10/2015 | Mizutani | G01S 13/931 342/27 |
| 2016/0200359 A1* | 7/2016 | Boeck | B62D 15/027 701/41 |
| 2017/0322295 A1 | 11/2017 | Loesch et al. | |

FOREIGN PATENT DOCUMENTS

| | | |
|---|---|---|
| JP | 4064528 | 3/2008 |
| JP | 2009-115757 | 5/2009 |
| JP | 2011-48641 | 3/2011 |

OTHER PUBLICATIONS

Nadari Shahi et al., "High resolution DOA estimation in fully coherent environments." Progress in Electromagnetics Research C, vol. 5, 135-148, 2008.
Extended European Search Report dated Jul. 9, 2019 for European Application No. 19160403.2.
Notice of Allowance dated Dec. 1, 2020 for Korean Patent Application No. 10-2018-0025682 and its English translation from Global Dossier.

* cited by examiner

APPARATUS AND METHOD FOR DETERMINING TARGET ANGLE BASED ON RADAR, AND RADAR APPARATUS WITH THE SAME

CROSS REFERENCE TO RELATED APPLICATION

This application claims priority from Korean Patent Application No. 10-2018-0025682, filed on Mar. 5, 2018, which is hereby incorporated by reference for all purposes as if fully set forth herein.

BACKGROUND OF THE INVENTION

1. Field of the Invention

An embodiment of the present disclosure relates to an apparatus and method for determining a target angle of a radar. Particularly, the embodiment of the present disclosure relates to an apparatus and a method for determining the angle of target detected by a radar system.

2. Description of the Prior Art

A radar apparatus mounted in a vehicle or the like is widely used as a sensor device for vehicle control. The radar apparatus may transmit electromagnetic waves having a predetermined frequency, receives a signal reflected from an object, and processes the received signal so as to extract the position of the object, speed information, or the like.

The radar used for vehicle control needs to have angular resolution with high resolution.

In particular, when a high-resolution algorithm is used in relation to the target angle analysis to measure the angle of the target, it is possible to calculate the angle information with high accuracy, but the calculation amount is increased.

In addition, when a low-resolution algorithm is used in relation to the target angle analysis, it is possible to reduce the calculation but the accuracy of target angle is decreased.

Accordingly, the present embodiment provides a method of effectively determining angle information of the target detected by a radar.

SUMMARY OF THE INVENTION

In this background, an aspect of the present disclosure is to provide a method and apparatus for effectively determining angle information of the target detected by a radar for vehicle.

Another aspect of the present disclosure is to provide an apparatus and method for efficiently determining an angle of a target by applying a high resolution algorithm and a low resolution algorithm.

Another aspect of the present disclosure is to provide an apparatus and method for efficiently determining the angle of the target according to the driving information of the vehicle.

Another aspect of the present disclosure is to provide an apparatus and method for determining an angle of a target by selectively applying a high-resolution algorithm and a low-resolution algorithm according to the driving information of the vehicle.

In accordance with an aspect of the present disclosure, there is provided an apparatus for determining a target angle, the apparatus including: a first angle determiner for determining a first angle which is an angle of a first group target included in a radar data; a driving route determiner for determining a possible driving route of a host vehicle based on a driving data of the host vehicle; a second group target determiner for determining a second group target including at least one target located on the possible driving route among the first group target based on the possible driving route and the first angle determined; a second angle determiner for determining a second angle that is an angle of the second group target located on the possible driving route among the first group target based on the possible driving route and the first angle determined; and, a target angle determiner for determining the target angle by determining the first angle as the target angle for the first group target excluding the second group target and by determining the second angle as the target angle for the second group target.

In accordance with another aspect of the present disclosure, there is provided a method for determining a target angle, the method including: determining a first angle which is an angle of a first group target included in a radar data; determining a possible driving route of a host vehicle based on a driving data of the host vehicle; determining a second group target including at least one target located on the possible driving route among the first group target based on the possible driving route and the first angle determined; determining a second angle that is an angle of the second group target located on the possible driving route among the first group target based on the possible driving route and the first angle determined; and, determining the target angle by determining the first angle as the target angle for the first group target excluding the second group target and by determining the second angle as the target angle for the second group target.

In accordance with another aspect of the present disclosure, there is provided a radar apparatus comprising: an antenna including one or more transmission antenna and one or more receiving antenna; a signal transmitter and receiver for controlling transmission and reception of a radar signal through the antenna; and, a controller for receiving a reflection signal reflected from a target and determining angle information of the target, wherein the controller is configured to determine a first angle which is an angle of the first group target in a sensing area based on a received signal by using a first angle calculation algorithm, and to determine a possible driving route of a vehicle based on a driving data of the vehicle, to determine a second group target including at least one target located on the possible driving route among the first group target based on the first angle and the possible driving route, to determine a second angle which is an angle of the second group target by using a second angle calculation algorithm different from the first angle calculation algorithm, and to determine the first angle of the first group target not selected as the second angle and the second angle as a final target angle.

According to embodiments of the invention, it is possible to effectively determine angle information of the target detected by a radar for vehicle.

Also, it is possible to efficiently determine an angle of a target by applying a high resolution algorithm and a low resolution algorithm according to embodiments of the invention.

Also, it is possible to determine the angle of the target based on the driving information of the vehicle according to embodiments of the invention.

Also, according to embodiments of the invention, it is possible to determine an angle of a target by selectively applying a high-resolution algorithm and a low-resolution algorithm according to the driving information of the vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
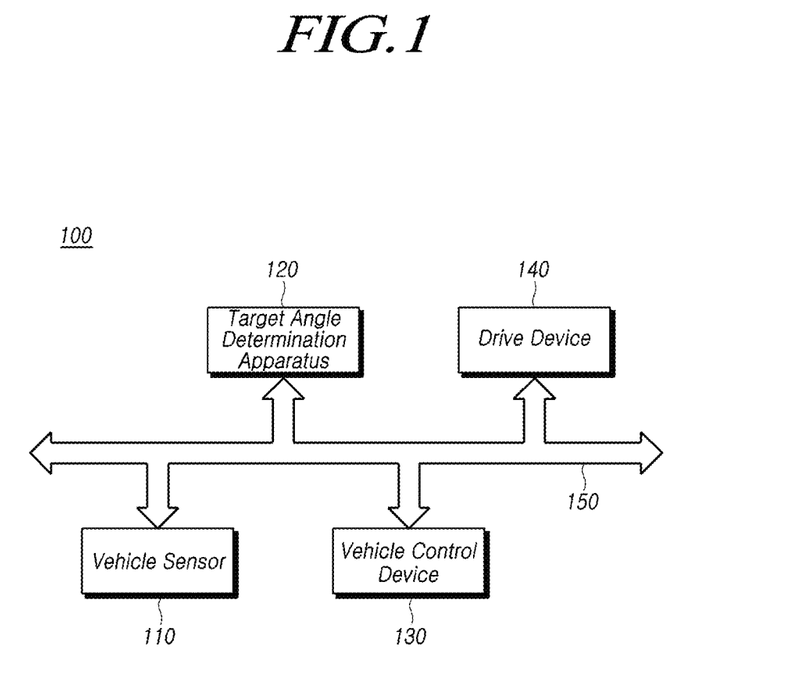
FIG. 1 is a schematic diagram of a target determination system according to the present embodiment.

FIG. 1 is a schematic diagram of a target determination system according to the present embodiment.

Hereinafter, the target determining system 100 is applied to a vehicle equipped with a radar as an example.

Referring to FIG. 1, a target determination system 100 according to one embodiment includes a vehicle sensor 110, a target angle determination apparatus 120, a vehicle control device 130, and a drive device 140, which elements may be interconnected via a vehicle communication path 150, such as a CAN.

The vehicle sensor 110 refers to any one of the vehicle sensors mounted on the vehicle and may transmit sensing information detecting the outside and inside of the vehicle to the target angle determination apparatus 120 and the vehicle control device 130.

In one embodiment, the vehicle sensor 110 may include a peripheral sensor that detects a target in sensing range adjacent to the vehicle, such as a radar sensor, a RIDAR sensor, a camera sensor, an infrared sensor, an ultrasonic sensor, or the like.

For example, the radar sensor is operable to transmit a pulse signal to a space around the vehicle, receive a reflection signal reflected on the target, calculate a target information such as distance, velocity, and angle of the target, and provide the target information to the target angle determination apparatus 120 and the vehicle control device 130.

The target angle determination apparatus 120 according to the present embodiment may be implemented as a part of, or in conjunction with, a vehicle sensor apparatus capable of calculating the angle information of a target within the sensing range.

In this case, the vehicle sensor may be a radar sensor device that transmits a radar signal and receives a reflection signal reflected from the target to detect the angle of the target. However, the present embodiment is not limited thereto, and may include any kind of sensors capable of calculating an angle of the target within the sensing range such as a camera sensor, an ultrasonic sensor, and so on.

Hereinafter, a radar sensor device capable of calculating the angle of the target within a certain angular sensing range of the vehicle will be described as an example.

The vehicle sensor 110 may also include a vehicle dynamics sensor that generates driving data of the vehicle such as a steering angle sensor, a vehicle speed sensor, a torque sensor, and the like. For example, the vehicle dynamics sensor as the vehicle sensor 110 is operable to generate a driving data which is all kinds of information which can be used to determine the expected driving route of the host vehicle, such as the travelling direction of the host vehicle, and operable to transmit the determined driving data to the target angle determination apparatus 120 and the vehicle control device 130.

In addition, the vehicle sensor 110 may include a navigation device including map information, a positioning sensor such as a GPS, and the like, and may be used to determine the curvature of the road on which the vehicle travels from map information or positioning information and to calculate the possible driving route of the vehicle based on the curvature of the road.

The target angle determination apparatus 120 may determine the angle of the target or a target angle. Specifically, the target angle determination apparatus 120 may determine the angle of the target which is the angle between the direction of the target in the space around the vehicle and the driving direction of the vehicle.

The target angle determination apparatus 120 may be operable to calculate a first angle of the first group target included in the radar data by using a first angle calculation algorithm with a low resolution, to determine a second group target which is part of the first group target based on the possible driving target of the vehicle, and to calculate a second angle of the determined second group target by using a second angle calculation algorithm with high resolution which is different from the first angle calculation algorithm.

More specifically, the target angle determination apparatus 120 may have a function of calculating a first angle which is an angle of the first group target in the sensing area by using a first angle calculation algorithm based on the received signal, a function of determining a second group target including at least one target located on the possible driving route among the first group targets based on the calculated first angle and possible driving route, a function of calculating a second angle of the second group target by using a second angle calculation algorithm different from the first angle calculation algorithm, and a function of determining a final target angle by determining the first angle of the first group target not selected as the second angle and the second angle as the final target angle.

Here, the angle of the target or the target angle may be determined based on the driving direction of the host vehicle.

A specific operation method of the target angle determination apparatus 120 will be described later with reference to FIG. 2 to FIG. 6.

The vehicle control device 130 may be operable to control driving of the vehicle. Specifically, the vehicle control device 130 may generate control signal and control the driving device 140 to control the driving of the vehicle based on the sensing information received from the vehicle sensor 110, the target angle information received from the target angle determination apparatus 120.

The driving device 140 may control the behavior of the vehicle including a change of the speed of the vehicle, a change of driving direction of the vehicle in accordance with the control signal.

Figure 2:
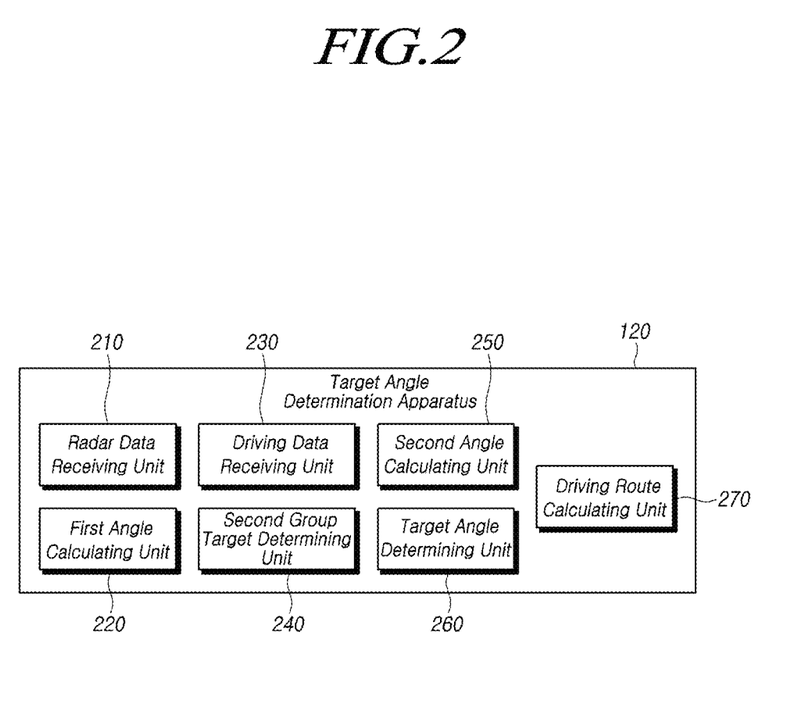
FIG. 2 is a block diagram of a target angle determining apparatus according to the present embodiment.

FIG. 2 is a block diagram of a target angle determining apparatus according to the present embodiment.

Referring to FIG. 2, the target angle determination apparatus 120 may include a radar data receiving unit 210, a first angle calculating unit 220, a driving data receiving unit 230, a second group target determining unit 240, a second angle calculating unit 250, a target angle determining unit 260, and a driving route calculating unit 270.

In this disclosure, the first angle calculating 220 may be used with the same meaning as the term of "a first angle determiner", and the driving route calculating unit 270 may be used with the same meaning as the term of "a driving route determiner". In addition, the second group target determining unit 240 may be used with the same meaning as the term of "a second group target determiner", and the second angle calculating unit 250 and the target angle determining unit 260 may be used with the same meaning as the term of "a second angle determiner" and "a target angle determiner" respectively.

Also, the target angle determination apparatus 120 may be used in an equivalent meaning with the term of "a controller".

The radar data receiving unit 210 may receive a radar data which is information obtained by scanning a space around the vehicle by the radar sensor as a kind of the vehicle sensor 110.

The first angle calculating unit 220 may calculate the angle of the target existing in the space around the vehicle. Specifically, the first angle calculating unit 220 may calculate the first angle which is the angle of the first group target including at least one of target included in the radar data by using the first angle calculation algorithm.

In one embodiment, the first angle calculation algorithm may be an algorithm for calculating an approximate target angle, i.e., a first angle that is a target angle with low resolution.

For example, the first angle calculation algorithm may provide a low calculation amount, a high processing speed, and a low accuracy angle calculation algorithm. Specifically, the first angle calculation algorithm may be an algorithm for calculating a first angle by comparing radar data with a predetermined reference value.

In one embodiment, the first angle calculation algorithm may be a Bartlett algorithm.

The driving data receiving unit 230 may receive the traveling data or driving data used for determining the driving state of the host vehicle from the vehicle dynamics sensor among the vehicle sensor 110.

The driving route calculating unit 270 may calculate the possible driving route that is the path or route where the host vehicle is traveling or where the traveling is scheduled to be carried out later.

In one embodiment, the driving route calculating unit 270 may calculate the possible driving route or a travelable route based on the lane. For example, when the vehicle travels on third-lane of the five-lane road, the driving route calculating unit 270 may determine the second-lane, third-lane and fourth-lane as the possible driving route of the vehicle.

In one embodiment, the driving route calculating unit 270 may calculate the possible driving route based on the steering information input from the driver. For example, when the vehicle drives the outermost lane in the intersection area with turning on the right direction indication lamp and the driver steers the steering wheel in the right direction, the driving route calculating unit 270 may determine a right vertical direction with reference to the travelling direction of the vehicle as the possible driving route.

The driving route calculating unit 270 may determine the curvature of the road on which the vehicle travels by using at least one information selected from the map information provided from the navigation system, the position information received from the GPS device, the steering angle information received from the vehicle dynamics sensor and may determine the possible driving route based on the road curvature.

The second group target determining unit 240 may determine a second group target that is a target to be considered in driving the host vehicle. That is, the second group target determining unit 240 may determine a second group target including at least one target selected from the first group target.

In one embodiment, the second group target determining unit 240 may determine the second group target based on the first angle which is the angle of the first group target and the possible driving route of the host vehicle. For example, the second group target determining unit 240 may determine one or more targets existing in the possible driving route of the host vehicle among the targets included in the first group target as the second group target by using the first angle for the first group target.

In one embodiment, the second group target determining unit 240 may update information on the second group target based on the changed driving data and the first angle of the first group target when the driving data of the host vehicle is changed.

At this time, the second group target may be selected as a part of the first group target, and the second group target may be selected among the first group targets based on the possible driving route of the host vehicle.

For example, if a total of ten first group targets exist within the detection range and if the possible driving route of the vehicle is the straight ahead direction, the targets from one target at the center of the detection range to nine targets located at the center of the detection range may be determined as the second group target.

If the driving route calculating section 270 predicts that the vehicle will make a lane change to the right lane based on the turn-on state of the right turn signal lamp or the right steering state, or if the driving route calculating section 270 determines the path directed to the right direction of the vehicle as the possible driving route due to the curvature of the front road, the targets from two to nine targets located on the right side of the detection range may be determined as the second group target.

At this time, the information for selecting the second group target among the first group targets may be at least one of the steering direction information, the steering angle information, information on the curved direction of the front road, and the curvature of the road.

In addition, the position and size of the area for selecting the second group target among the first group targets in the detection range may be varied according to the value of the steering angle or the curvature of the road.

As an example, if the value of the steering angle or the curvature of the road is relatively large, the first group target located in the region which is largely deflected to the left or the right among the detection range may be determined as the second group target.

The second angle calculating unit 250 may calculate the angle of the second group target. Specifically, the second angle calculating unit 250 may calculate the second angle which is the angle of the second group target located on the possible driving route of the host vehicle among the first group targets by using the second angle calculation algorithm have.

According to one embodiment, the second angle calculation algorithm may be an algorithm different from the first angle calculation algorithm.

As an example, if the first angle calculation algorithm is a low resolution angle calculation algorithm, the second angle calculation algorithm may be a high resolution angle calculation algorithm.

In one embodiment, the second angle calculation algorithm may be an angle calculation algorithm having a high computational complexity, a slow processing speed, and a high angle accuracy compared to the first angle calculation algorithm.

In one embodiment, the second angle calculation algorithm may include a Multiple Signal Classification (MUSIC) algorithm, an Estimation of Signal Parameters via Rotational Invariance Techniques (ESPRIT) algorithm.

The target angle determining unit may finally determine the angle of the target as a target angle or a final target angle.

Specifically, the target angle determining unit 260 may determine the angle of the target included in the first group target as the first angle, and may determine the angle of the target included in the second group target among the targets of the first group target as the second angle.

In addition, the target angle determining unit 260 may determine at least one of the first angle and the second angle as the target angle or the final target angle.

In Particular, the target angle determining unit 260 may determine the second angle as the final target angle for the second group target located on the possible driving route of the host vehicle, and may determine the first angle as the final target angle for the other targets of the first group target except the selected second group target.

As a result, it possible to minimize the system load by calculating the target angle with high accuracy only for the target existing in the driving route the vehicle which can affect the driving of the vehicle based.

The target angle determination apparatus 120 or the radar data receiving unit 210, the first angle calculating unit 220, the driving data receiving unit 230, the second group target determining unit 240, the second angle calculating unit 250, the target angle determining unit 260, and the driving route calculating unit 270 included therein may be implemented as a part of a module in the radar sensor device or a module of the ECU that performs an object detection function by a radar.

The radar device or the ECU may include a processor, a storage device such as a memory, and a computer program capable of performing a specific function. The radar data receiving unit 210, the first angle calculating unit 220, the driving data receiving unit 230, the second group target determining unit 240, the second angle calculating unit 250, the target angle determining unit 260, and the driving route calculating unit 270 included in the radar device may be implemented as software modules performing their respective functions.

In addition, the target angle determination apparatus 120 according to the present embodiment may be implemented with a part of the module of the radar sensor apparatus of the vehicle, but is not limited thereto, and may be implemented as a module of a driver's assist system (DAS) of the vehicle or as a part of an integrated controller (Domain Control Unit; DCU) which performs an integrated control for a plurality of the driver's assist system (DAS).

The radar sensor device as the vehicle sensor 110 used in the target angle determination system according to the present embodiment may include an antenna unit including at least one transmission antenna and at least one reception antenna, and a signal transmission/reception unit for performing signal transmission and reception through the antenna unit, and a signal processing unit for receiving the reflection signal reflected from the first group target or the second group target determined by the target angle determination apparatus 120 and for calculating position information of the target such as the target angle of the target.

The antenna unit may include a transmission antenna and a reception antenna, and the transmission antenna may further include a transmission antenna for long-range detection and a transmission antenna for short-range detection.

The transmission antenna and the reception antenna may include one or more micro-strip array antenna elements, but is not limited thereto.

More specifically, the antenna unit according to the present embodiment may include the transmission antenna including at least one first transmission antenna and a second transmission antenna spaced apart from the first transmission antenna by a first vertical distance B in a vertical direction, and a reception antenna including at least one reception antenna disposed at the same vertical position as the first transmission antenna.

According to the configuration described as above, two transmission antennas are arranged at a predetermined vertical distance in a vertical direction, and transmission signals are simultaneously transmitted from two transmission antennas, and reflection signals reflected by the target are received and processed so that both horizontal information and vertical information of the target may be simultaneously acquired in the long-range detection mode and the short-range detection mode.

According to another embodiment of the present disclosure, the antenna unit may include a transmission antenna unit which includes a first transmission antenna group including a first transmission antenna extending in a first direction of a vertical direction, and a second transmission antenna group including a second transmission antenna and a third transmission antenna extending in a second direction opposite to the first direction and spaced apart from the first transmission antenna by a first vertical distance.

The antenna unit may include a reception antenna unit which includes a first reception antenna group including a first reception antenna and a second reception antenna extending in the first direction, and a second reception antenna group including a third reception antenna and a fourth reception antenna extending in the second direction and spaced apart from the first reception antenna group by a second vertical distance.

According to the configuration described as above, a part of a plurality of transmission antenna is arranged in the first direction perpendicular to the ground, the remaining transmission antennas of a plurality of transmission antennas are arranged in the second direction opposite to the first direction, a part of the plurality of reception antennas is arranged in the first direction, the remaining reception antenna is arranged in the second direction, and the transmission antenna for transmitting the transmission signal and the reception antenna for receiving the reflection signal reflected from the object are properly selected. As a result, the angular resolution in the horizontal and vertical directions may be improved in both of the long-range detection mode and the short-range detection mode.

The structure of the antenna unit of the radar sensor apparatus according to the present embodiment is not limited to the above-described structure, and other types of antennas may be used.

The radar sensor according to the present embodiment may implement a multi-dimensional antenna arrangement and a multiple-input and multiple-output (MIMO) based signal transmission/reception scheme in order to form a virtual antenna aperture larger than an actual antenna aperture.

As an example, a two-dimensional antenna array may be used in order to achieve a high angular precision and resolution in a horizontal direction and vertical direction. By using a two-dimensional radar antenna array, signals may be transmitted and received by two scan times individually multiplexed horizontally and vertically, and MIMO may be used separately from two-dimensional radar horizontal and vertical scans.

More specifically, the radar sensor according to the present embodiment may include a two-dimensional antenna array configuration including a transmitting antenna unit with a total of 12 transmission antennas Tx and a receiving antenna unit with a total of 16 reception antennas Rx so that a total of 192 virtual reception antenna arrangements may be utilized.

In this case, the transmission antenna unit includes three transmission antenna groups including four transmission antennas, the first transmission antenna group is spaced apart from the second transmission antenna group by a predetermined distance in the vertical direction, and the first transmission antenna group or second transmission antenna group may be spaced apart from the third transmission antenna group by a predetermined distance D in the horizontal direction.

The reception antenna unit may include four reception antenna groups including four reception antennas, and each reception antenna group is arranged to be spaced apart in the vertical direction, and the reception antenna unit may be disposed between the first transmitting antenna group and the third transmission antenna groups spaced apart from each other horizontally.

In another embodiment of the present disclosure, the antenna unit of the radar sensor may be arranged as a two-dimensional antenna array, and as a result, each antenna patch has a Rhombus grid layout thereby reducing unnecessary side lobes.

Alternatively, the two-dimensional antenna arrangement may include a V-shaped antenna array in which a plurality of radiation patches are arranged in a V-shape, and more specifically may comprise two V-shaped antenna arrays. In this case, a single feed may be provided to the vertex (Apex) of each V-shaped antenna array.

Alternatively, the two-dimensional antenna arrangement may include an X-shaped antenna array in which a plurality of radiation patches are arranged in an X-shape, and more specifically may comprise two X-shaped antenna arrays. In this case, a single feed may be provided to the center of each X-shaped antenna array.

The radar sensor device according to the present embodiment may utilize a MIMO antenna system in order to achieve a high detection accuracy or resolution in vertical and horizontal directions.

More specifically, each transmission antenna may transmit a signal having an independent waveform different from each other in a MIMO system. That is, each transmission antenna transmits a signal of an independent waveform differentiating from that for the other transmission antennas, and each reception antenna may determine the transmission antenna transmitting the transmission signal correspondent with the received signal reflected from the target due to the different waveforms of these signals.

In addition, the radar sensor according to the present embodiment may be configured to include a radar housing for accommodating a substrate and a circuit including the transmission antenna and the reception antenna, and a radome forming the exterior of the radar housing.

The radome may be made of a material capable of reducing the attenuation of the radar signal transmitted and received, and the radome may be constituted as a part of an outer surface of the vehicle component such as the front bumper, the rear bumper, the grill of the vehicle and the side body of the vehicle.

The radome of the radar sensor according to the present embodiment may be disposed inside a vehicle grill, a bumper, a vehicle body, and may be disposed as a part of the outer surface of a part of the vehicle body, as a result, it is possible to provide a convenience in mounting the radar sensor to the vehicle while improving the appearance of the vehicle.

A radar sensor device or a radar system according to the present embodiment may include at least one of a front detection radar sensor mounted on the front of the vehicle, a rear detection radar sensor mounted on the rear of the vehicle, and a side detection radar sensor mounted on respective side of the vehicle.

The radar sensor device or radar system according to the present embodiment may include an electronic control unit (ECU) or a processor for analyzing the transmission and reception signals and processing the data and thereby for acquiring information of the target. In addition, a communication link including an appropriate vehicle network bus such as a CAN may be utilized for the data transmission or signal communication between the radar sensor device and the ECU.

The radar sensor device according to the present embodiment may further include a signal transmission and reception unit for controlling the transmission and reception of the radar signal. The signal transmission and reception unit may be operable to transmit the linear frequency modulation signal through the antenna unit under the control of the electronic control unit and receive the reflection signal reflected from the target.

In detail, the signal transmitting and reception unit may include a voltage controlled oscillator (VCO), a power divider, and a power amplifier in a transmission part.

The voltage controlled oscillator VCO may generate a sinusoidal wave having a constant frequency based on controlling of a pulse modulation controller. The power divider may perform signal switching and power distribution to a plurality of transmission antennas or reception antennas.

Furthermore, the power amplifier may perform a function of amplifying the amplitude of the transmission wave transmitted from the transmission antenna.

The signal transmitting and reception unit may include a low noise amplifier (LNA) for low-noise amplifying a signal received in a reception antenna, a mixer for mixing a transmission signal and a reception signal and a low-pass filter (LPF) in a reception part.

The mixer may perform a convolution of the transmission signal and the reception signal corresponding to the transmission signal so as to generate a bit signal, and the low-pass filter may perform a function of passing only low-frequency signal components corresponding to the bit frequency of the bit signal generated by the mixer.

The electronic control unit or a signal processing unit may receive the reception signal reflected from the target by using each reception antenna, and may calculate the information of the target such as position, velocity, angle of the target based on the reception signal and the transmission signal.

In this disclosure, the antenna unit, the signal transmitting and reception unit, and the electronic control unit or a signal processing unit of the radar apparatus may be used with the same meaning as the term of "antenna", "signal transmitter and receiver" and "controller" respectively.

Although the target angle determination apparatus 120 according to the present embodiment has been described as an apparatus separate from the vehicle sensor 110 such as a radar sensor as a part of the target determination system 100, the target angle determination apparatus 120 according to the present embodiment may be implemented as a module included in the radar sensor device.

In this case, the first angle calculating unit 220, the driving data receiving unit 230, the second group target determining unit 240, the second angle calculating unit 250, and the target angle determining unit 260 may be implemented as parts within the signal processing unit or the electronic control unit of the radar sensor apparatus.

That is, according to another embodiment of the present disclosure, the target determining system may include a radar sensing device including an antenna unit including at least one transmission antenna and at least one reception antenna, a signal transmission and reception unit for controlling transmission and reception of a radar signal through the antenna unit, and a controller as a signal processing unit for calculating the angle information of the target.

According to this embodiment of the present disclosure, the controller as the signal processing unit performs the function of the target angle determining apparatus according to the present embodiment. Specifically, the controller may be operable to perform a function of calculating the first angle which is the angle of the first group target in the detection range by using the first angle calculation algorithm, a function of calculating the possible driving route of the host vehicle based on the driving data of the vehicle, a function of determining the second group target including at least one of the target located existing in the possible driving route from the first group target based on the calculated first angle and the possible driving route, a function of calculating the second angle of the determined second group target by using the second angle calculation algorithm different from the first angle calculation algorithm, and a function of determining the second angle for the second group target and the first angle for the first group target not selected as the second group target as the final target angle.

Figure 3:
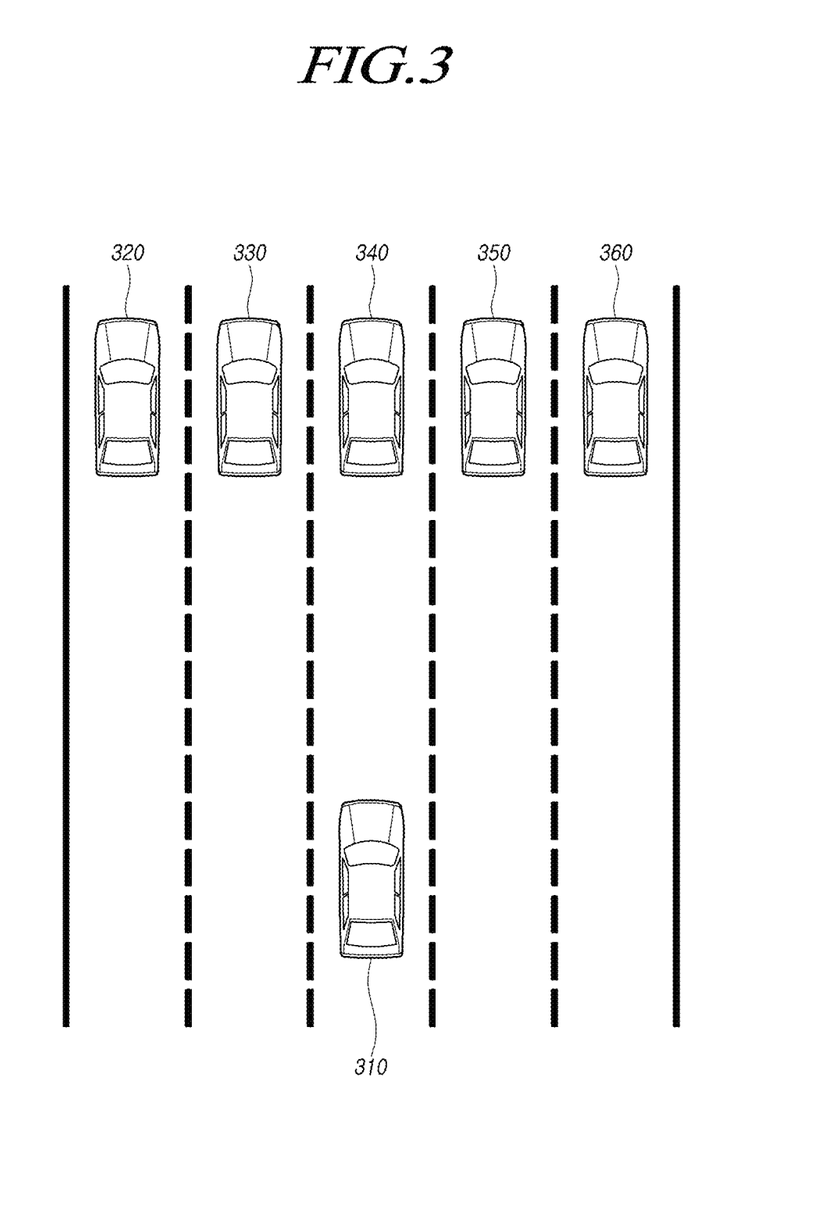
FIG. 3 is a diagram for explaining an example for determining a second group target according to the present embodiment.

FIG. 3 is a diagram for explaining an example for determining a second group target according to the present embodiment.

Referring to FIG. 3, there are shown a host vehicle 310 traveling on third lane of a five lanes road and other vehicles 320, 330, 340, 350 and 360 travelling on the front of the host vehicle 310. At this case, the target angle determination apparatus 120 may determine the possible driving route of the host vehicle includes a second lane, a third lane and fourth lane based on the driving data of the host vehicle received from the vehicle sensor 110. That is, the target to be considered in the traveling of the host vehicle is the other vehicle 330 located in the second lane, the other vehicle 340 located in the third lane, and the other vehicle 350 located in the fourth lane.

The target angle determination apparatus 120 may determine all of other vehicles 320 to 360 travelling on the first lane to the fifth lane on the front of the host vehicle 310 as the first group target and may calculate the first angles for each of other vehicles 320 to 360 as the first group target.

In this case, the target angle determination apparatus 120 may utilize the first angle calculation algorithm having a relatively small calculation amount or a low resolution such as a Bartlett algorithm.

Thereafter, the target angle determination apparatus 120 may determine the other vehicles 330 to 350 existing in the angular range including the second lane, the third lane and the fourth lane adjacent to the possible driving route of the host vehicle as the second group target.

The target angle determination apparatus 120 may calculate the second angles for the other vehicles 330 to 350 existing in the second lane, the third lane and the fourth lane. Finally, the target angle determination apparatus 120 may determine the first angle as the final target angle for the other vehicle 320 on the first lane and the other vehicle 360 on the fifth lane, and may determine the second angle as the final target angle for the other vehicles 330, 340, 350 existing in the second lane, the third lane and the fourth lane.

The second angle calculation algorithm having a higher computation amount or higher resolution compared to the first angle calculation algorithm may be used for calculating the second angle for the second group target.

The second angle calculation algorithm may include a MUSIC (Multiple Signal Classification) algorithm, ESPRIT (Estimation of Signal Parameters via Rotational Invariance Techniques) algorithm.

Figure 4:
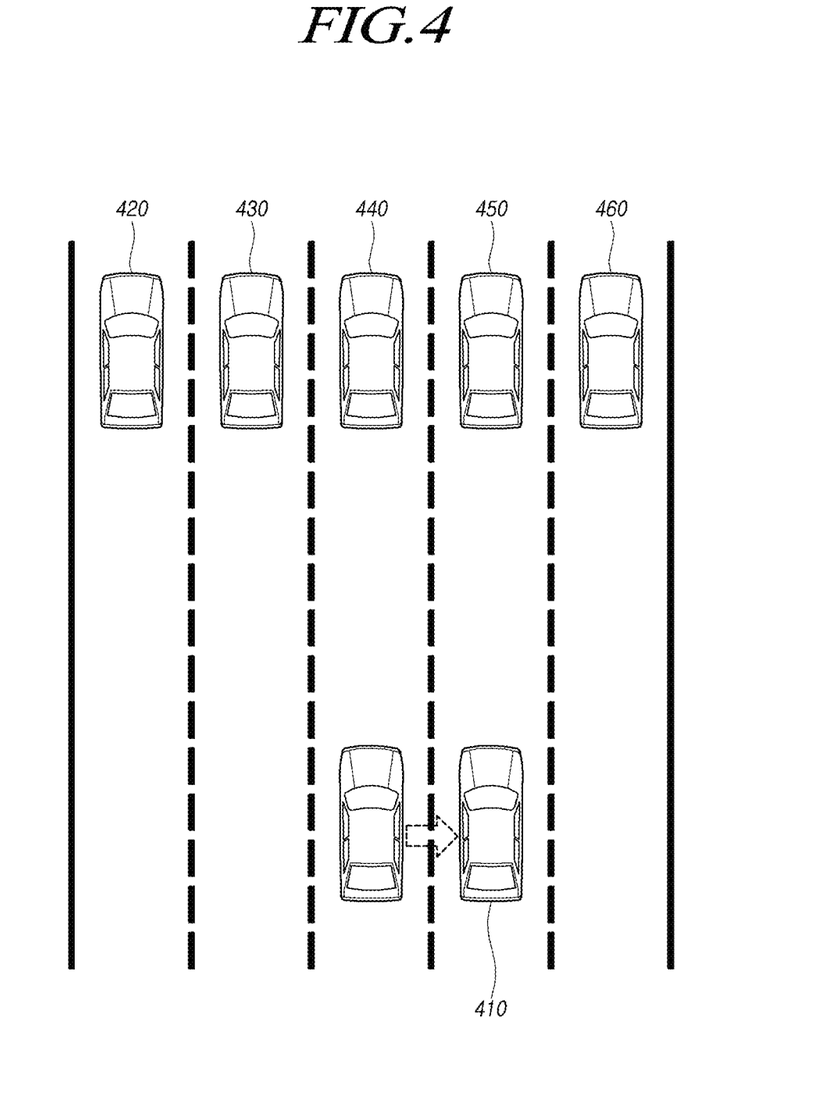
FIG. 4 is a view for explaining an example of a second group target determination upon changing a driving data according to present embodiment.

FIG. 4 is a view for explaining an example of a second group target determination upon changing a driving data according to present embodiment.

Referring to FIG. 4, there are shown a host vehicle 410 which drives on the third lane of five lanes road and is predicted to change from the third lane to the fourth lane and other vehicles 420, 430, 440, 450 and 460 travelling on the front of the host vehicle 410. At this case, the target angle determination apparatus 120 may determine an area including the third lane, the fourth lane and the fifth lane roads as the area for selecting the second group target selection based on the possible driving route of the host vehicle, since the host vehicle drives on the third lane and is predicted to change from the third lane to the fourth lane.

The target angle determination apparatus 120 may determine the other vehicles 440, 450 and 460 existing in the third lane, the fourth lane and the fifth lane as the second group target, and may calculate the second angle of the other vehicles 440, 450 and 460.

Finally, the target angle determination apparatus 120 may determine the first angle as the final target angle for the other vehicle 410 on the first lane and the other vehicle 420 on the second lane, and may determine the second angle as the final target angle for the other vehicles 440, 450 and 460 existing in the third lane, the fourth lane and the fifth lane.

That is, the driving route calculating unit 270 may determine whether the lane change of the host vehicle is predicted or not based on the turn signal lamp state of the host vehicle, the input steering angle and the like, and the second group target determining unit 240 may determine the target of the first group target existing on the lanes to be changed as the second group target.

In addition, although not shown, the driving route calculating unit 270 may calculate the curvature of the road on which the vehicle travels by using at least one of the map information provided from navigation, position information received from the GPS device, and steering angle information received from the vehicle dynamic sensor.

The second group target determining unit 240 may determine a part of the first group targets existing on the possible driving route determined based on the curvature of the road as a second group target.

Figure 5:
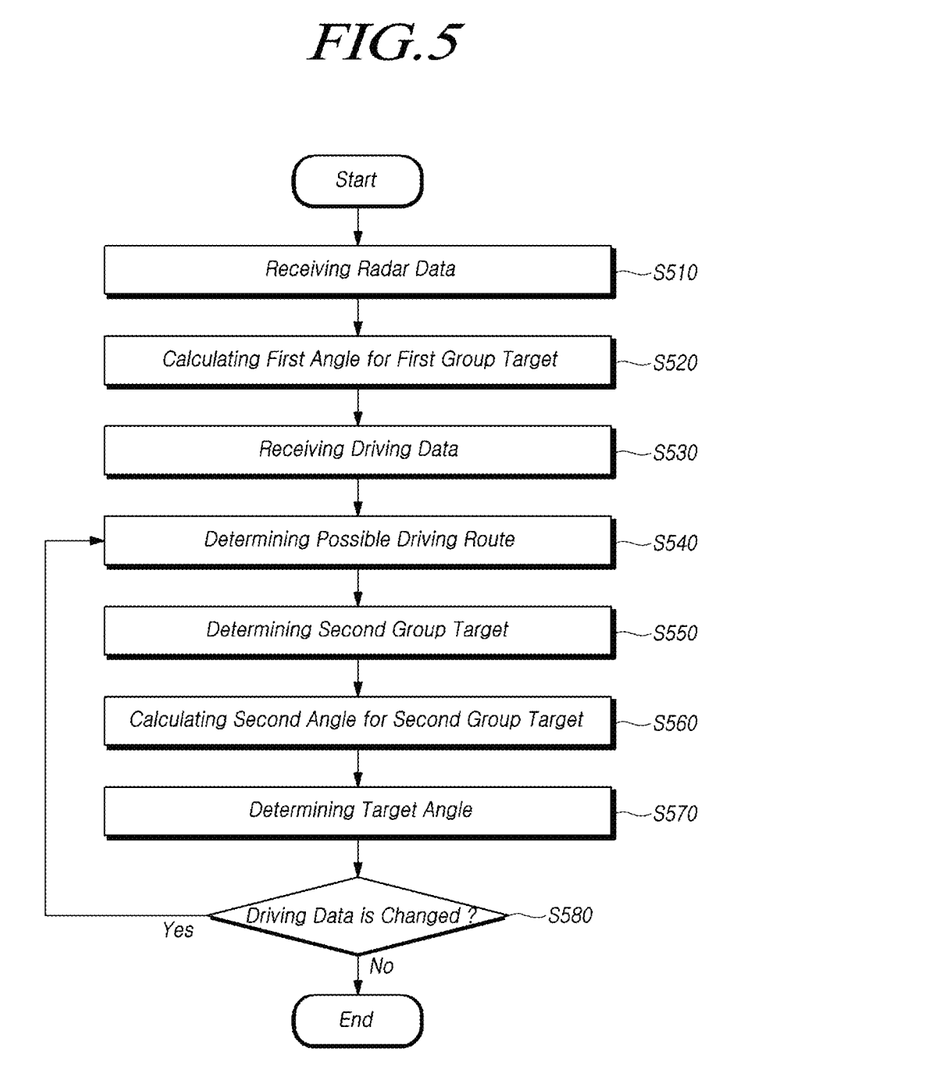
FIG. 5 is a flowchart of a method for determining a target angle according to the present embodiment; and, FIG. 6 is a block diagram of a target angle determination apparatus according to another embodiment.

FIG. 5 is a flowchart of a method for determining a target angle according to the present embodiment.

Hereinafter, the method for determining a target angle according to the present embodiment will be described as an example performed by the target angle determination apparatus 120 shown in FIG. 1, and it is apparent that the description of the target angle determination apparatus 120 described above may be applied to the method for determining a target angle according to the present embodiment.

In step S510, the target angle determination apparatus 120 may receive the radar data. Specifically, the target angle determination apparatus 120 may receive radar data which is information obtained by scanning the space around the vehicle by using the radar sensing device.

In step S520, the target angle determination apparatus 120 may calculate the first angle. Specifically, the target angle determination apparatus 120 may calculate the first angle which is the angle of the first group target included in the radar data by using the first angle calculation algorithm.

In step S530, the target angle determination apparatus 120 may receive the driving data of the host vehicle. Specifically, the target angle determination apparatus 120 may receive the driving data from the vehicle sensor 110 which is used for checking the driving information of the host vehicle and determining the possible driving route of the host vehicle.

In step S540, the target angle determination apparatus 120 may calculate the possible driving route of the host vehicle. Specifically, the target angle determination apparatus 120 may determine the possible driving route which is a route that the host vehicle is expected to travel based on the driving data.

In step S550, the target angle determination apparatus 120 may determines the second group target. Specifically, the target angle determination apparatus 120 may determine a second group target which includes one or more targets to be considered in the traveling of the host vehicle among the first group targets based on the first angle and the possible driving route.

In step S560, the target angle determination apparatus 120 may calculate the second angle of the second group target. Specifically, the target angle determination apparatus 120 may calculate the second angle which is the angle of the target included in the second group target by using the second angle calculation algorithm.

In step S570, the target angle determination apparatus 120 may determine the final target angle of the target. Specifically, the target angle determining apparatus 120 may determine the first angle for the first group target excluding the second group target as the final target angle, and may determine the second angle for the target included in the second group target among the first group targets as the final target angle.

Figure 6:
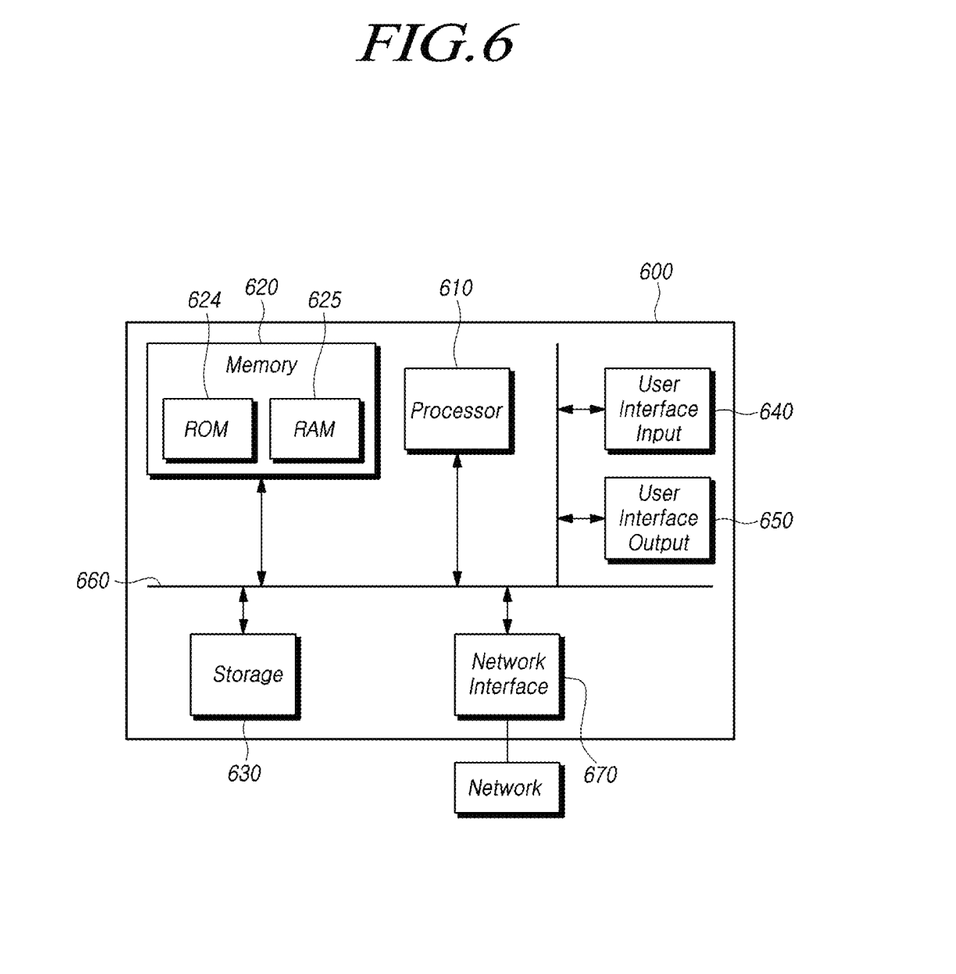

FIG. 6 is a block diagram of a target angle determination apparatus according to another embodiment.

The target angle determination apparatus or the target determining system described above may be embodied in a computer system, for example, as a computer-readable recording medium.

As shown in the FIG. 6, a computer system 600 as the target angle determination apparatus 120 or the target determining system 100 may include one or more element of a processors 610, a memory 620, a storage 630, a user interface input 640, and a user interface output 650, which are capable of communicating with one another via a communication bus 660. In addition, the computer system 600 may also include a network interface 670 for connecting to a network.

The processor 610 may be a CPU or a semiconductor device that executes processing instructions stored in memory 620 and/or in the storage 630.

Memory 620 and storage 630 may include various types of volatile/non-volatile storage media. For example, the memory may include ROM 624 and RAM 625.

Accordingly, embodiments of the present disclosure may be embodied in a computer-implemented method or non-volatile computer storage medium storing computer-executable instructions. The computer-executable instructions may be executed by the processor to perform the method according to at least one embodiment of the present disclosure.

In the target angle determining apparatus having such a hardware configuration, a software or a program for performing the functions of a radar data receiving unit 210, a first angle calculating unit 220, a driving data receiving unit 230, a second group target determining unit 240, a second angle calculating unit, the target angle determining unit 260 and the driving route calculating unit 270 may be stored or installed in the memory 620 or the storage unit 630, and may be executed by the processor 610.

More particularly, the computer system 600 for performing the target angle determination apparatus 120 according to the present embodiment may execute software stored in a memory so as to calculate a first angle of the first group target included in the radar data by using the first angle calculation algorithm with the low resolution, to determine a part of the first group target ad the second group target based on the possible driving route of the host vehicle, and to calculate the second angle of the second angle target selected from the first group target by using the second angle calculation algorithm with the high resolution based on the possible driving route of the host vehicle.

The construction of the determination of the target angle by the execution of such a program may be same as those described above with reference to FIGS. 1 to 5, and therefore, a detail description thereof will be omitted in order to avoid duplication.

According to the target angle determination apparatus and radar device of the present embodiment, it is possible to efficiently determine the angle of the target by selectively applying the angle calculation algorithm of high resolution and the angle calculation algorithm of low resolution according to the driving information of the vehicle.

More specifically, the first angle of the first group target included in the radar data may be calculated by the first angle calculation algorithm of low resolution, and a part of the first group targets may be determined as the second group target on the basis of the possible driving route of the vehicle, and the second angle of the determined second group target may be calculated by the second angle calculation algorithm of a high resolution so that the precise target angle may be re-calculated only for the target existing in the area around the vehicle and being capable of affecting the driving of the host vehicle. Therefore, it is possible to minimize unnecessary calculation operations and reduce the system load.

The apparatus and method according to embodiments of the present disclosure may be implemented in the form of program instructions that can be executed through various computer means and may be recorded in a computer-readable medium. The computer readable medium may include program instructions, data files, data structures.

The hardware devices described above may be configured to operate as one or more software modules to perform the functions according to the present embodiment.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. An apparatus for determining a target angle, the apparatus comprising:
   at least one processor; and
   at least one memory storing instructions that, when executed, cause the at least one processor to:
   determine first angles of first group targets included in a radar data using a first angle calculation algorithm with lower resolution than a second calculation algorithm;
   determine a possible driving route of a host vehicle based on a driving data of the host vehicle;
   select one or more second group targets including at least one target located on the possible driving route from the first group targets based on the possible driving route and the first angles of the first group targets determined using the first angle calculation algorithm;
   determine one or more second angles of the one or more second group targets, selected from the first group targets based on the possible driving route and the first angles determined using the first angle calculation algorithm, using the second angle calculation algorithm with higher resolution than the first calculation algorithm; and,
   determine target angles of the first group targets, not selected as the second group target, based on the first angles determined using the first angle calculation algorithm with lower resolution than the second calculation algorithm, and determine one or more target angles of the one or more second group targets, selected from the first group targets, based on the one or more second angles determined using the second angle calculation algorithm with higher resolution than the first calculation algorithm.

2. The apparatus of claim 1, wherein the instructions to determine the possible driving route of the host vehicle determine a curvature of a road on which the host vehicle drives by using at least one of map information, position information, and steering angle information and calculate the possible driving route based on the curvature of the road, and,
   the instructions to select the one or more second group targets select one or more of the first group targets existing in an area including the possible driving route of the host vehicle as the one or more second group targets.

3. The apparatus of claim 1, wherein the instructions further cause the at least one processor to: receive the driving data of the host vehicle from a vehicle dynamics sensor mounted on the host vehicle.

4. The apparatus of claim 1, wherein the second angle calculation algorithm has a larger calculation amount than the first angle calculation algorithm.

5. The apparatus of claim 1, wherein the second angle calculation algorithm has a higher angular resolution than the first angle calculation algorithm.

6. The apparatus of claim 1, wherein the instructions to determine the possible driving route of the host vehicle determine at least one of a driving lane of the host vehicle, a left lane of the driving lane of the host vehicle, and a right lane of the driving lane of the host vehicle as the possible driving route of the host vehicle.

7. The apparatus of claim 1, wherein the instructions to determine the possible driving route of the host vehicle confirm whether a lane change of the host vehicle based on at least one of a state of a turn signal lamp of the host vehicle and an input steering angle, and,
   the instructions to select the one or more second group targets select at least one target of the first group targets existing in an area adjacent to the lane to be changed as the one or more second group targets.

8. The apparatus of claim 1, wherein the instructions to determine the possible driving route of the host vehicle determine a changed possible driving route based on the changed driving data if the driving data of the host vehicle is changed, and,
   the instructions to select the one or more second group targets select the one or more second group targets from the first group targets based on the changed possible driving route.

9. The apparatus of claim 1, wherein the instructions to determine the one or more second angles of the one or more second group targets selected from the first group targets are performed only when the one or more second group targets are located on the possible driving route.

10. A method for determining a target angle, the method comprising:
    determining first angles of first group targets included in a radar data using a first angle calculation algorithm with lower resolution than a second calculation algorithm;
    determining a possible driving route of a host vehicle based on a driving data of the host vehicle;

selecting one or more second group targets including at least one target located on the possible driving route from the first group targets of the first group targets based on the possible driving route and the first angles determined using the first angle calculation algorithm;

determining one or more second angles of the one or more second group targets, selected from the first group targets based on the possible driving route and the first angles determined using the first angle calculation algorithm, using the second angle calculation algorithm with higher resolution than the first calculation algorithm; and, determining target angles of the first group targets, not selected as the one or more second group targets, based on the first angles determined using the first angle calculation algorithm with lower resolution than the second calculation algorithm, and determining one or more target angles of the one or more second group targets, selected from the first group targets, based on the one or more second angles determined using the second angle calculation algorithm with higher resolution than the first calculation algorithm.

11. The method of claim 10, wherein, the determining of the possible driving route of the host vehicle comprises determining a curvature of a road on which the host vehicle drives by using at least one of map information, position information, and steering angle information and calculating the possible driving route based on the curvature of the road, and, wherein, the selecting of one or more second group targets comprises selecting one or more of the first group targets existing in an area including the possible driving route of the host vehicle as the one or more second group targets.

12. The method of claim 10, further comprising receiving the driving data of the host vehicle from a vehicle dynamics sensor mounted on the host vehicle.

13. The method of claim 10, wherein the second angle calculation algorithm has a larger calculation amount than the first angle calculation algorithm.

14. The method of claim 10, wherein the second angle calculation algorithm has a higher angular resolution than the first angle calculation algorithm.

15. The method of claim 10, wherein the determining of the possible driving route comprises determining at least one of a driving lane of the host vehicle, a left lane of the driving lane of the host vehicle, and a right lane of the driving lane of the host vehicle as the possible driving route of the host vehicle.

16. The method of claim 10, wherein, the determining of the possible driving route of the host vehicle comprises determining a changed possible driving route based on the changed driving data if the driving data of the host vehicle is changed, and, wherein the selecting of the one or more second group targets comprises selecting the one or more second group targets from the first group targets based on the changed possible driving route.

17. The method of claim 10, wherein, the determining of the possible driving route of the host vehicle comprises confirming whether a lane change of the host vehicle based on at least one of a state of a turn signal lamp of the host vehicle and an input steering angle, and, wherein, the selecting of the one or more second group targets comprises selecting at least one target of the first group targets existing in an area adjacent to the lane to be changed as the one or more second group targets.

18. The method of claim 10, wherein the determining of the one or more second angles of the one or more second group targets selected from the first group targets is performed only when the one or more second group targets are located on the possible driving route.

19. A radar apparatus comprising:

an antenna unit including one or more transmission antenna and one or more receiving antenna;

a signal transmitter and receiver for controlling transmission and reception of a radar signal through the antenna unit; and, a controller for receiving a reflection signal reflected from a target and determining angle information of the target, wherein the controller is configured to:

determine first angles of first group targets in a detection area based on a received signal by using a first angle calculation algorithm with lower resolution than a second calculation algorithm, determine a possible driving route of a vehicle based on a driving data of the vehicle, select one or more second group targets including at least one target located on the possible driving route from the first group target based on the possible driving route and the first angles of the first group targets determined using the first angle calculation algorithm, determine one or more second angles of the second group target by using the second angle calculation algorithm with higher resolution than the first angle calculation algorithm, and determine target angles of the first group targets, not selected as the one or more second group targets, based on the first angles determined using the first angle calculation algorithm with lower resolution than the second calculation algorithm, and determining one or more target angles of the one or more second group targets, selected from the first group targets, based on the one or more second angles determined using the second angle calculation algorithm with higher resolution than the first calculation algorithm.

20. The radar apparatus of claim 19, wherein the controller is configured to determine the one or more second angles of the one or more second group targets selected from the first group targets only when the one or more second group targets are located on the possible driving route.

* * * * *